United States Patent
Thien et al.

(10) Patent No.: US 11,500,601 B2
(45) Date of Patent: Nov. 15, 2022

(54) METHOD AND SYSTEM FOR PROVIDING A MESH NETWORK OF DISPLAYS USING A UNIVERSAL SERIAL BUS

(71) Applicant: DELL PRODUCTS, LP, Round Rock, TX (US)

(72) Inventors: Vui Khen Thien, Sengkang (SG); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/159,393

(22) Filed: Jan. 27, 2021

(65) Prior Publication Data
US 2022/0236939 A1    Jul. 28, 2022

(51) Int. Cl.
G06F 3/14      (2006.01)
G06F 13/40     (2006.01)
G06F 13/42     (2006.01)

(52) U.S. Cl.
CPC ........ G06F 3/1423 (2013.01); G06F 13/4022 (2013.01); G06F 13/4282 (2013.01); G06F 2213/0042 (2013.01)

(58) Field of Classification Search
CPC ............... G06F 3/1423; G06F 13/4022; G06F 13/4282; G06F 2213/0042
See application file for complete search history.

(56) References Cited

U.S. PATENT DOCUMENTS

| | | |
|---|---|---|
| 2014/0104138 A1 | 4/2014 | Brown |
| 2015/0222843 A1 | 8/2015 | Avrahami |
| 2016/0316259 A1 | 10/2016 | Kambhatla |
| 2018/0213204 A1* | 7/2018 | Hoshihara ............ H04N 21/462 |
| 2019/0196592 A1 | 6/2019 | You et al. |
| 2020/0073455 A1* | 3/2020 | Na .......................... H04L 12/10 |
| 2020/0374152 A1 | 11/2020 | Ceekala et al. |
| 2020/0374486 A1 | 11/2020 | Ceekala et al. |
| 2021/0133136 A1* | 5/2021 | Chan ..................... G06F 13/385 |

* cited by examiner

*Primary Examiner* — Sahlu Okebato
(74) *Attorney, Agent, or Firm* — Larson Newman, LLP

(57) ABSTRACT

An information handling system includes displays, each of which has a first upstream-facing port (UFP), a second UFP, a downstream-facing port (DFP), and a multiplexer for selecting among the first UFP and the second UFP. The DFP of each display is connected to the first UFP of its respective succeeding display so as to form a ring network topology. A host computer is connected to the second UFP of a first display, and the multiplexer of the first display configured to select the second UFP.

16 Claims, 5 Drawing Sheets

METHOD AND SYSTEM FOR PROVIDING A MESH NETWORK OF DISPLAYS USING A UNIVERSAL SERIAL BUS

FIELD OF THE DISCLOSURE

The present disclosure generally relates to information handling systems, and more particularly relates to a mesh network of displays using a universal serial bus (USB).

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes displays, each of which has a first upstream-facing port (UFP), a second UFP, a downstream-facing port (DFP), and a multiplexer for selecting between the first UFP and the second UFP. The DFP of each display is connected to the first UFP of its respective succeeding display so as to form a ring network topology. A host computer is connected to the second UFP of a first display, and the multiplexer of the first display selects the second UFP.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
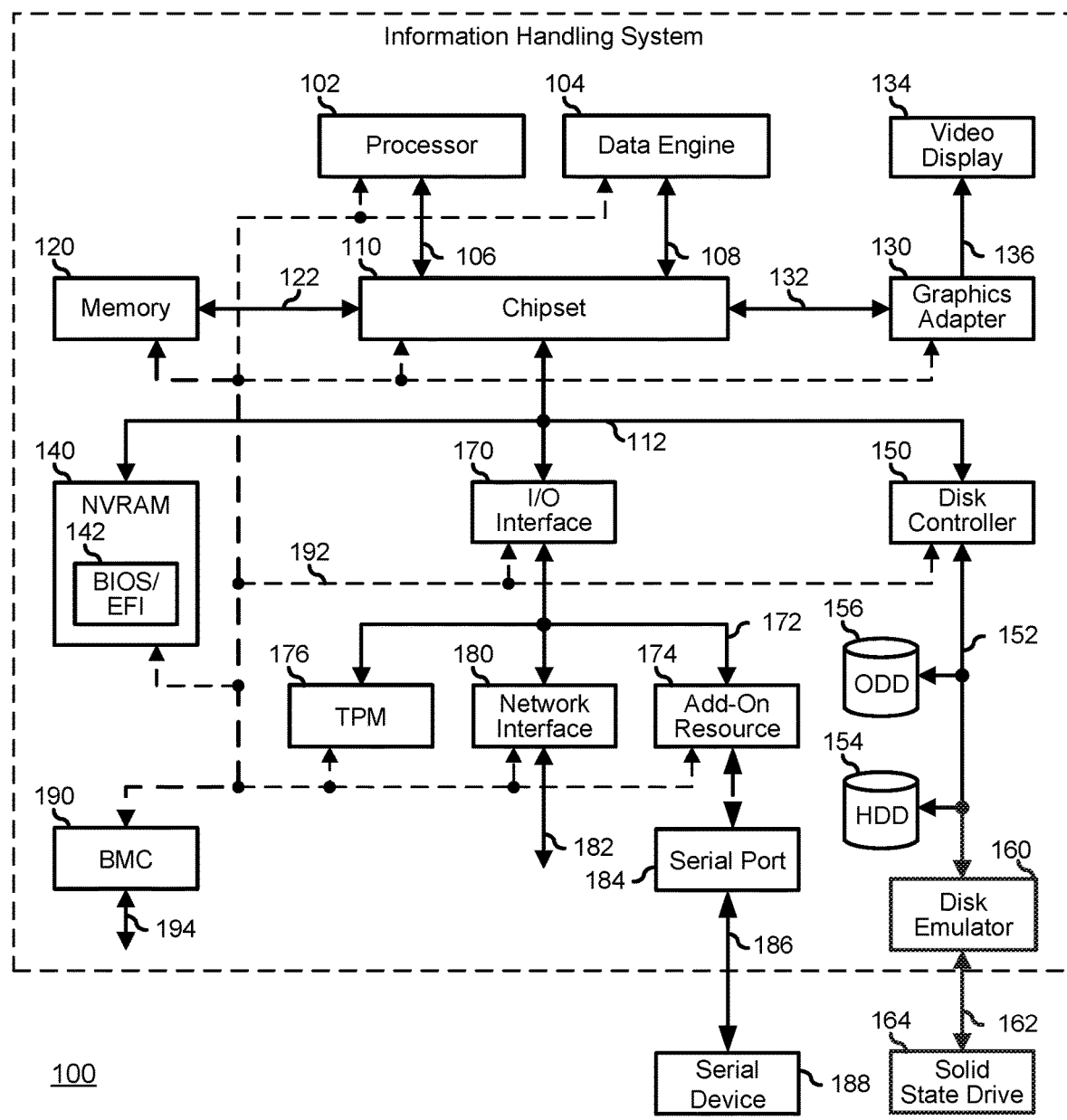
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

A serial interface is provided. As an example, a serial port 184 is connected via add-on resource 174 to provide a serial interface. Serial port 184 provides a serial connection 186 to a serial device 188. As an example, serial port 184 can be a Universal Serial Bus (USB) port, compliant with the USB standard of the USB Implementers Forum (USB-IF), such as a Type C USB port (USB-C). As an example, serial connection 186 can be a USB connection, and serial device 188 can be a USB device.

Network interface 180 represents a NIC disposed within information handling system 100, on a main circuit board of the information handling system, integrated onto another component such as chipset 110, in another suitable location, or a combination thereof. Network interface device 180 includes network channel 182 that provides interfaces to devices that are external to information handling system 100. In a particular embodiment, network channel 182 is of a different type than peripheral channel 172 and network interface 180 translates information from a format suitable to the peripheral channel to a format suitable to external devices. An example of network channel 182 includes an InfiniBand channel, a Fibre Channel channel, a Gigabit Ethernet channel, proprietary channel architectures, or a combination thereof. Network channel 182 can be connected to external network resources (not illustrated). The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external IHS.

Figure 2:
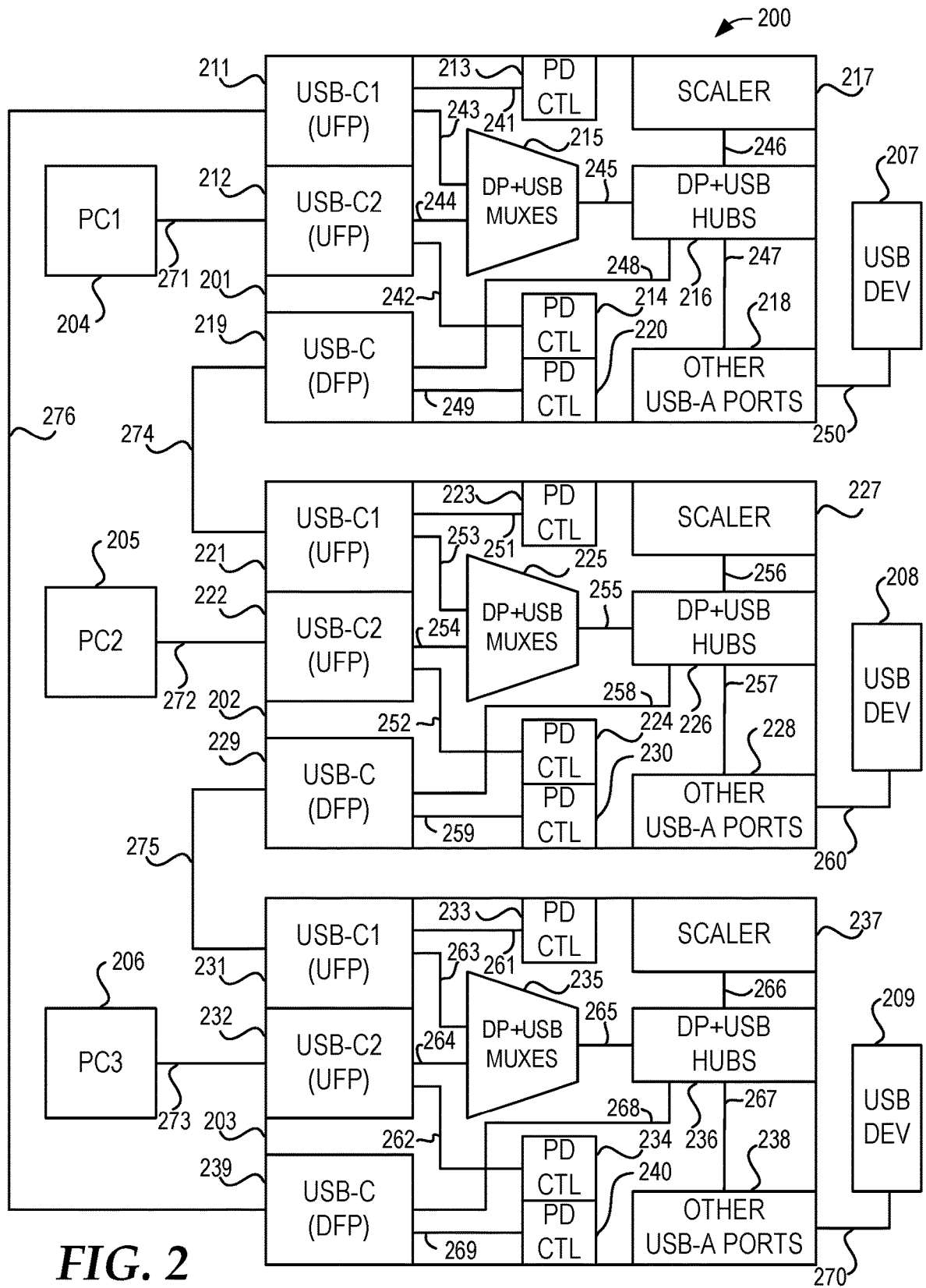
FIG. 2 is a block diagram illustrating an apparatus including a ring network of displays according to an embodiment of the present disclosure.

FIG. 2 is a block diagram illustrating an information handling system including a ring network of displays according to an embodiment of the present disclosure. Information handling system 200 includes a display 201, a display 202, a display 203, a computer 204, a computer 205, a computer 206, a peripheral device 207, a peripheral device 208, and a peripheral device 209. As an example, any or all of displays 201, 202, and 203 may be a video display, such as video display 134 of FIG. 1. As an example, any or all of computers 204, 205, and 206 may be an information handling system, such as information handling system 100 of FIG. 1 or the subset thereof to which video display 134 is connected. As an example, any or all of peripheral devices 207, 208, and 209 may be a USB device, such as USB device 188 of FIG. 1.

Display 201 includes USB-C1 serial port 211, which is an upstream-facing port (UFP), USB-C2 serial port 212, which is a UFP, USB-C serial port 219, which is a downstream-facing port (DFP), power delivery (PD) controllers 213, 214, and 220, DisplayPort (DP) video and USB serial multiplexers (DP+USB muxes) 215, DP+USB hubs 216, scaler 217, and other USB-A ports 218. USB-C1 serial port 211 is internally connected to PD controller 213 via connection 241 and to a multiplexer input of DP+USB muxes 215 via connection 243. USB-C2 serial port 212 is internally connected to PD controller 214 via connection 242 and to a multiplexer input of DP+USB muxes 215 via connection 244. A multiplexer output of DP+USB muxes 215 is connected to an input of DP+USB hubs 216 via connection 245. Scaler 217 is connected to DP+USB hubs 216 via connection 246. One or more other USB-A ports are connected to DP+USB hubs 216 via connection 247. An output of DP+USB hubs 216 is internally connected to USB-C serial port 219 via connection 248. USB-C serial port 219 is internally connected to PD controller 220 via connection 249. Computer 204 (PC1) is connected via serial connection 271 to USB-C2 serial port 212. As an example, serial connection 271 may be a USB serial connection. USB device 207 is connected to one of other USB-A ports 218 via serial connection 250, which, for example, may be a USB serial connection.

Display 202 includes USB-C1 serial port 221, which is an upstream-facing port (UFP), USB-C2 serial port 222, which is a UFP, USB-C serial port 229, which is a downstream-facing port (DFP), power delivery (PD) controllers 223, 224, and 230, DisplayPort (DP) video and USB serial multiplexers (DP+USB muxes) 225, DP+USB hubs 226, scaler 227, and other USB-A ports 228. USB-C1 serial port 221 is internally connected to PD controller 223 via connection 251 and to a multiplexer input of DP+USB muxes 225 via connection 253. USB-C2 serial port 222 is internally connected to PD controller 224 via connection 252 and to a multiplexer input of DP+USB muxes 225 via connection 254. A multiplexer output of DP+USB muxes 225 is connected to an input of DP+USB hubs 226 via connection 255. Scaler 227 is connected to DP+USB hubs 226 via connection 256. One or more other USB-A ports are connected to DP+USB hubs 226 via connection 257. An output of DP+USB hubs 226 is internally connected to USB-C serial port 229 via connection 258. USB-C serial port 229 is internally connected to PD controller 230 via connection 259. Computer 205 (PC2) is connected via serial connection 272 to USB-C2 serial port 222. As an example, serial connection 272 may be a USB serial connection. USB device 208 is connected to one of other USB-A ports 228 via serial connection 260, which, for example, may be a USB serial connection.

Display 203 includes USB-C1 serial port 231, which is an upstream-facing port (UFP), USB-C2 serial port 232, which is a UFP, USB-C serial port 239, which is a downstream-facing port (DFP), power delivery (PD) controllers 233, 234, and 240, DisplayPort (DP) video and USB serial multiplexers (DP+USB muxes) 235, DP+USB hubs 236, scaler 237, and other USB-A ports 238. USB-C1 serial port 231 is internally connected to PD controller 233 via connection 261 and to a multiplexer input of DP+USB muxes 235 via connection 263. USB-C2 serial port 232 is internally connected to PD controller 234 via connection 262 and to a multiplexer input of DP+USB muxes 235 via connection 264. A multiplexer output of DP+USB muxes 235 is connected to an input of DP+USB hubs 236 via connection 265. Scaler 237 is connected to DP+USB hubs 236 via connection 266. One or more other USB-A ports are connected to DP+USB hubs 236 via connection 267. An output of DP+USB hubs 236 is internally connected to USB-C serial port 239 via connection 268. USB-C serial port 239 is internally connected to PD controller 240 via connection 269. Computer 206 (PC3) is connected via serial connection 273 to USB-C2 serial port 232. As an example, serial connection 273 may be a USB serial connection. USB device 209 is connected to one of other USB-A ports 238 via serial connection 270, which, for example, may be a USB serial connection.

USB-C serial port 219, which is a DFP, of display 201 is connected via connection 274 to USB-C1 serial port 221, which is a UFP, of display 202. USB-C serial port 229, which is a DFP, of display 202 is connected via connection 275 to USB-C1 serial port 231, which is a UFP, of display 203. USB-C serial port 239, which is a DFP, of display 203 is connected via connection 276 to USB-C1 serial port 211, which is a UFP, of display 201. Thus, each display being used has a connection from one of its UFP serial ports to the DFP serial port of a preceding display and a connection from its DFP serial port to a UFP serial port of a succeeding display such that the inter-display serial connections form a ring network topology which includes all of the displays being used.

Each of scalers 217, 227, and 237 includes a microcontroller configured to execute stored program commands to control operation of displays 201, 202, and 203, respectively. As examples, displays 201, 202, and 203 can perform methods described below with respect to FIGS. 3 and 4 in accordance with a finite state machine shown in FIG. 5. While the three displays 201, 202, and 203 are illustrated, any number of displays may be joined together to form a ring network topology.

Figure 3:
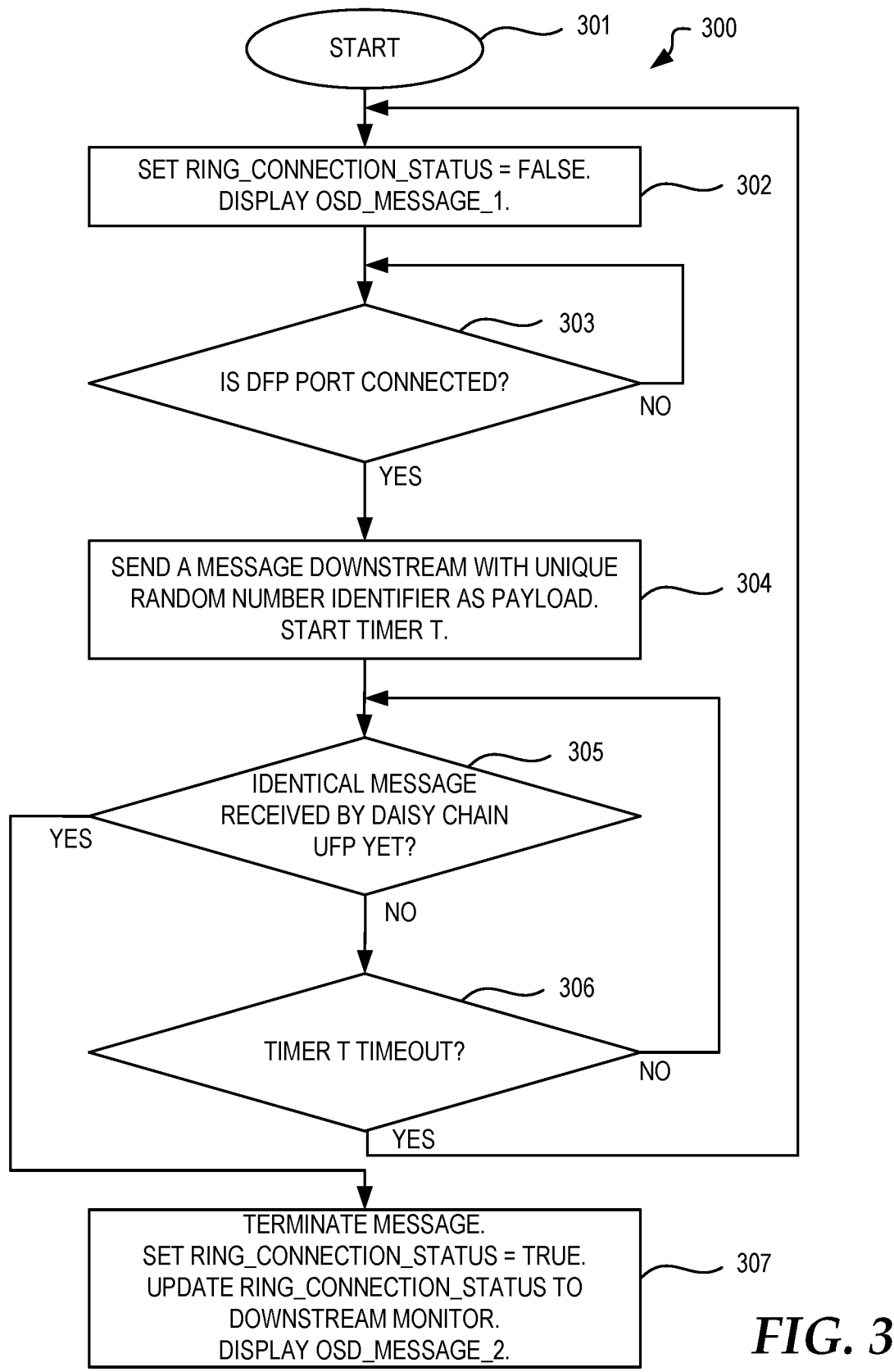
FIG. 3 is a flow diagram illustrating a method of ring connection discovery according to an embodiment of the present disclosure.

FIG. 3 is a flow diagram illustrating a method of ring connection discovery according to an embodiment of the present disclosure. Method 300 begins at block 301 and continues to block 302. At block 302, a value of a parameter RING_CONNECTION_STATUS is set to be false, and a message OSD_MESSAGE_1 is displayed. From block 302, method 300 continues to decision block 303. At decision block 303, a decision is made as to whether or not the DFP is connected. If the DFP is not connected, method 300 remains at decision block 303 and waits for the DFP to be connected. If the DFP is connected, method 300 continues to block 304. At block 304, a message is sent downstream with a payload that is discernable to the sending display as distinct from other messages it or other displays may send. As an example, a unique random number identifier, which may be truly random or pseudorandom, may be included as or within the discernable payload of the message.

From block 304, method 300 continues to decision block 305. At decision block 305, a decision is made as to whether or not an identical message having the same discernable payload as the message set at block 304 has been received at a UFP of the display connected in the ring network topology, which can be referred to as the daisy chain UFP, yet. If an identical message has not yet been received at the daisy chain UFP of the display sending the message with the discernable payload, method 300 continues to decision block 306. At decision block 306, a decision is made as to whether or not a timer T has expired. If the timer T has not yet expired, method 300 returns to decision block 305. If the timer T has expired, method 300 returns to block 302. If, at decision block 305, an identical message bearing the same discernable payload as the message sent in block 304 has been received at the daisy chain UFP of the display that sent the message in block 304, method 300 continues to block 307. At block 307, the message is terminated, the value of the parameter RING_CONNECTION_STATUS is set to true, the updated value of the parameter RING_CONNECTION_STATUS is sent downstream via the DFP of the display to the succeeding display located immediately downstream, and a message OSD_MESSAGE_2 is displayed.

Figure 4:
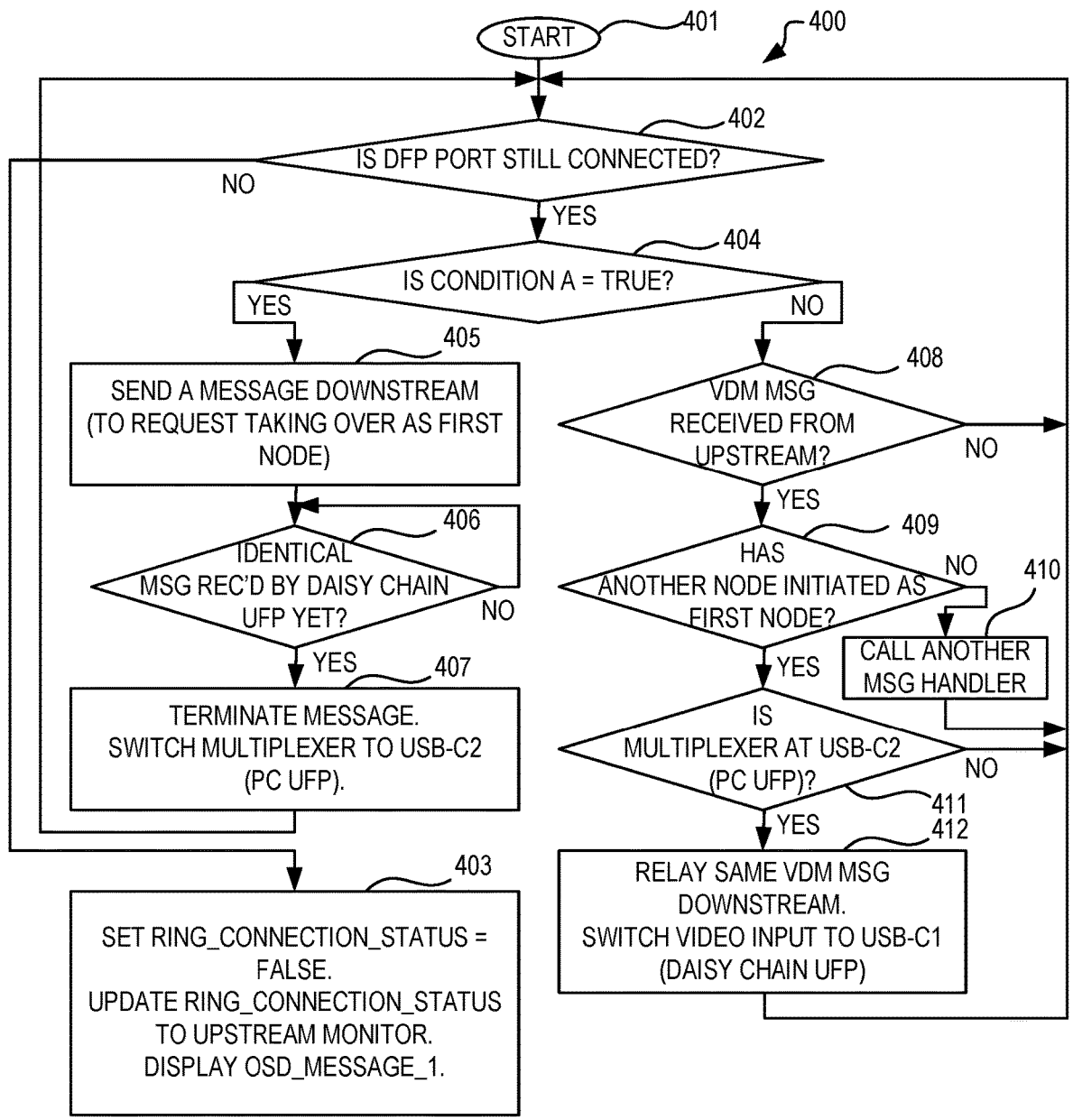
FIG. 4 is a flow diagram illustrating a method of ring connection maintenance according to an embodiment of the present disclosure.

FIG. 4 shows a method of ring connection maintenance according to an embodiment of the present disclosure. Method 400 begins at block 401 and continues to decision block 402. At decision block 402, a decision is made as to whether or not the DFP is still connected. If the DFP is not still connected, method 400 continues to block 403. At block 403, the value of the parameter RING_CONNECTION_STATUS is set to false, the updated value of the parameter RING_CONNECTION_STATUS is sent to a preceding display located immediately upstream, and a message OSD_MESSAGE_1 is displayed. If, at decision block 402, the decision is made that the DFP is still connected, method 400 continues to decision block 404. At decision block 404, a decision is made as to whether or not a condition A is true.

The condition A is defined as an alternative of either (a) a new personal computer (PC) connection has occurred at a PC UFP (i.e., a UFP that is not the daisy chain UFP) or (b) a user has manually switched the selected input from the daisy chain UFP to the PC UFP or (c) this monitor was the first node before the last request was received, and has detected loss of video signal from current first node for a period of time. If the decision is made that the condition A is true, method 400 continues to block 405. At block 405, a message is sent downstream, wherein the message requests that the display take over as a first node of the ring network topology. From block 405, method 400 continues to decision block 406. At decision block 406, a decision is made as to whether or not an identical message has been received at a daisy chain UFP of the display that sent the message at block 405, the identical message being identical to the message that was sent at block 405. If the decision is made at block 406 that an identical message has not been received at the daisy chain UFP yet, method 400 remains at decision block 406 awaiting receipt of the identical message. If the decision is made at block 406 that an identical message has been received at the daisy chain UFP, method 400 continues to block 407. At block 407, the message is terminated, and the multiplexer is switched to the USB-C2 (PC UFP) serial port. From block 407, method 400 returns to decision block 402.

If, at decision block 404, the decision was made that the condition A was not true, method 400 continues to decision block 408. At decision block 408, a decision is made as to whether or not a vendor-defined message (VDM) has been received from upstream. If the decision is made that a VDM has not been received from upstream, method 400 returns to decision block 402. If, at decision block 408, the decision is made that a VDM has been received from upstream, method 400 continues to decision block 409. At decision block 409, a decision is made as to whether or not another node has initiated a request to be the first node of the ring network topology. If the decision is made that another node has not initiated a request to be the first node of the ring network topology, method 400 continues to block 410. At block 410, a call is made to another message handler to handle the VDM.

From block 410, method 400 returns to decision block 402. If, at decision block 409, the decision is made that another node has initiated to be the first node of the ring network topology, method 400 continues to decision block 411. At decision block 411, a decision is made as to whether or not the multiplexer is selecting the USB-C2 (PC UFP) serial port. If the decision is made that the multiplexer is not selecting the USB-C2 (PC UFP) serial port, method 400 returns to decision block 402. If, at decision block 411, the decision is made that the multiplexer is selecting the USB-C2 (PC UFP) serial port, method 400 continues to block 412. At block 412, the same VDM that was received is relayed downstream, and the video input is switched to USB-C1 (daisy chain UFP) using the multiplexer.

Figure 5:
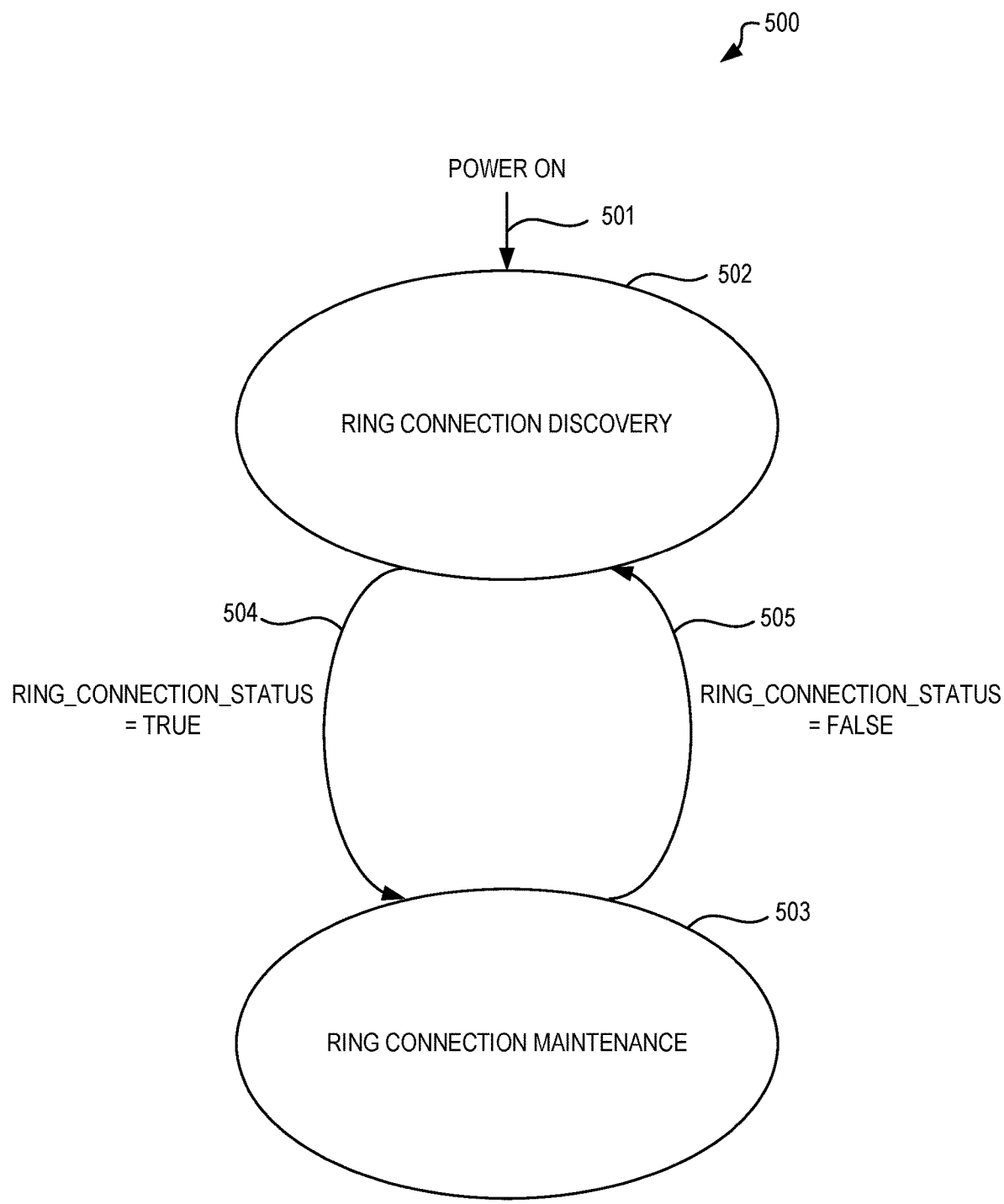
FIG. 5 is a state diagram illustrating a finite state machine (FSM) for implementing a method including a ring connection discovery method and a ring connection maintenance method according to an embodiment of the present disclosure.

FIG. 5 shows a finite state machine (FSM) for implementing a method including a ring connection discovery method and a ring connection maintenance method according to an embodiment of the present disclosure. FSM 500 comprises a ring connection discovery state 502 and a ring connection maintenance state 503. Method 300 of FIG. 3 for ring connection discovery is performed in ring connection discovery state 502. Method 400 of FIG. 4 for ring connection maintenance is performed in ring connection maintenance state 503. When power is applied to a portion of an information handling system, such as to a display of the information handling system, FSM 500 is placed in ring connection discovery state 502, according to state transition 501. When the value of the parameter RING_CONNECTION_STATUS becomes true, FSM 500 changes from ring connection discovery state 502 to ring connection maintenance state 503, according to state transition 504. When the value of the parameter RING_CONNECTION_STATUS becomes false, FSM 500 changes from ring connection maintenance state 503 to ring connection discovery state 502, according to state transition 505.

In accordance with at least one embodiment, each node transitions between a ring connection discovery method or submethod and a ring connection maintenance method or submethod depending on a value of a parameter RING_CONNECTION_STATUS. A node does not start a ring connection maintenance method or submethod and initiate a request to assume control as a primary node unless a ring connection has been discovered, which is flagged by setting the values of the parameter RING_CONNECTION_STATUS to true, according to a ring connection discovery method or submethod. Any change in connection status of a DFP of one of the displays can trigger that display to clear its parameter RING_CONNECTION_STATUS by setting it to a false value and to propagate that change to the other displays that are nodes on the ring display network. Such a change causes all displays in the network to transition back to their ring connection discovery states in which they perform a ring connection discovery method or submethod.

In accordance with at least one embodiment, an information handling system and method provide a ring network of displays using serial communications connections via serial communications interfaces, for example, USB-C ports. A plurality of displays according at least one embodiment of such information handling system or method can autonomously provide display source selection based on the mere establishment of a connection of one of the plurality of displays to an information handling system, such as a PC, without the need for specific control instructions to be communicated from the connected information handling system (or any other information handling system connected to any other of the plurality of displays) to initiate display source selection. The plurality of displays themselves can be self-configuring, with a display among the plurality of displays able to promote itself among its peers and demote any of its peers which may have been previously promoted. Thus, self-arbitration of authority of control over the plurality of displays can be provided by the ring network of the displays themselves without the need for an external entity, such as a computer connected to one of the displays, to communicate specific control instructions to any of the plurality of displays.

In accordance with at least one embodiment, in a multi-display environment, an information handling system and a method for command control to be autonomously and universally communicated between displays, for multiple displays to autonomously and universally share display capabilities and sensor data. Instead of each display acting as a independent device controlled only by a graphics processing unit (GPU) of its host computer though video inputs, by a built-in on-screen display (OSD) menu, or by a display manager application, any display of a ring network of multiple displays can assert control over the other displays of the ring network, for example, based on sensing of sensors of the display asserting control. The display asserting control can be self-initiating in its assertion of control, avoiding the need for another network node to grant authority to the display asserting control.

In accordance with at least one embodiment, the USB-C upstream and downstream ports of each display of a plurality of displays are used to provide communication to create a ring network of the plurality of displays. Once the displays are connected to one another in a series of USB-C connections forming a ring network to connect the plurality of displays, the method uses a configuration channel (CC) along the USB-C connections to pass vendor-defined messages (VDMs) between the various displays that will be shared between the scalers of the individual displays to establish a ring network. The VDMs are generated by the power delivery (PD) controller within a display. VDMs will be generated to share device capabilities, such as size, resolution, color settings, brightness settings, sensor capabilities, the like, and combinations thereof.

The method can also identify a primary display by identifying which of the displays in the ring network is directly connected to a host computer, such as a PC. The identified display, as a node in the ring network, then is promoted to the role of being the primary node, exerting control over the other displays of the ring network, while all other displays remain or are demoted to serve the role of secondary nodes in the ring network, responsive to control messages provided by the primary node. The display elevated to be the primary node then consolidates data from the various connected displays and communicates to the PC, and any control from the PC to the displays is relayed through the display serving as the primary node. The method also accommodates multiple host computers, such as PCs, connected to displays of the ring network. In a situation with multiple host computers, a display connected to one such host computer can be selected to serve as the primary node.

Such selection can be performed by the host computer connected to the monitor to serve as the primary node, by the first host-computer-connected display connected to the ring network (either by virtue of it having a connection to a host computer and being the first display connected to the ring network or by virtue of it being connected to the ring network and being the first of the displays connected to the ring network to have a host computer connected to it), or by the most recent host-computer-connected display connected to the ring network (either by virtue of it being having a connection to a host computer and being the most recent display connected to the ring network or by virtue of it being connected to the ring network and being the most recent of the displays connected to the ring network to have a host computer connected to it). If more than one of the foregoing mechanisms are used to perform such selection, arbitration can be provided to select which of the mechanisms will have precedence to select the display which will act as the primary node.

In accordance with at least one embodiment, upstream and downstream Display Port (DP) interfaces with multi-stream transport (MST) are used, with the display data channel (DDC) used as the channel for command control data to be sent between displays. The control commands are generated by a DP controller of the display and managed by the scaler of the display.

By providing autonomous control of the multi-display environment from within the displays of the multi-display environment, the information handling system and method can provide display selection control regardless of whether or not a host computer is connected to a display of the ring network of displays and regardless of which operating system (OS) or operating systems (OSs) are controlling one or more host computers connected to one or more of the displays of the ring network of displays.

In accordance with at least one embodiment, a ring network of displays is established via connections of upstream-specific and downstream-specific communication ports of the displays to form the ring network. As examples, the upstream-specific and downstream-specific communication ports may be selected from USB ports, such as USB-C ports, DP ports, the like, or combinations thereof.

In accordance with at least one embodiment, a primary control node for a multi-display environment is established based on a change of connection state of a connection of a host computer, such as a PC, to a display of the multi-display environment. The host computer may be a computer itself or, for example, a docking station into which the computer itself may or may not be connected.

In accordance with at least one embodiment, a need for additional multiplexers within a display can be avoided when supporting larger numbers of host computers by allowing connections for the larger number of host computers to be spread among a ring network of displays. By providing a ring network of displays, even though the communication ports of the displays through which connections are made may have unidirectional attributes (e.g., being specifically downstream-facing ports or being specifically upstream-facing ports), no particular host computer is prejudiced by its connection point in relation to the communication ports having unidirectional attributes, as communication in an opposite direction contradicting a unidirectional attribute can be performed by transmitting such communication in an opposite direction around the ring network topology.

Without the ring network topology in accordance with at least one embodiment, directional constraints would apply to the communication of video streams between displays, to the ability to detect, at other displays, USB devices connected to displays, to the communication of information as to the presence or absence of displays within the system, and to the communication of display source control information between the displays within the system (to the extent that the presence of such displays could even be detected). At least one embodiment utilizing a ring network topology can overcome such directional constraints and provide detection of displays, communication of information as to the presence or absence of displays between the displays, communication of display source control information between the displays, detection of USB devices connected to displays, communication among displays of information regarding the presence or absence of USB devices connected to displays, detection of host computers connected to the displays, communication of information regarding the presence or absence of host computer connections to the displays, selection of a primary network node among the displays, selection among video streams from among host computers connected to the displays, and communication of video streams between displays, all without regard to topological relationships of displays at different locations around the ring network.

In accordance with at least one embodiment, a display is provided with one downstream-facing port (DFP) and at least two upstream-facing ports (UFPs). Differential signals from both UFPs are multiplexed by a multiplexer in the display, with the selected differential signals provided to a hub within the display. A first UFP of the UFPs is dedicated to serve as a daisy chain UFP for connection to the DFP of another display to establish a ring network topology connection. A second UFP of the UFPs is dedicated to serve as a host computer connection UFP (PC UFP). The ring network topology can be selectively logically severed at a single point within the ring network by switching a multiplexer of a display to select signals from the USB-C2 port of the display, which is connected to a host computer. Thus, signals from that host computer can be passed around the entire ring network if the other displays in the ring network have their multiplexers set to select signals from the USB-C1 ports of those other displays. Thus, whether the signals are used locally by the display connected to the host computer, provided via one hop along the ring network to an adjacent display in the ring network, or provided via up to N−1 multiple hops along the ring network to another display, the signals can be provided to any or all displays in the ring network even if each connection over which such hops occur from display to display can support only unidirectional communication.

In accordance with at least one embodiment, a configuration channel (CC) line between successive nodes in the ring network is not multiplexed and is always connected. Such independence from any multiplexer setting allows inter-display communication to always be available regardless of a source selection determined by a multiplexer setting.

In accordance with at least one embodiment, vendor-defined messages (VDMs) allow any monitor to usurp control as a primary node on certain events. VDMs also allow changes to any monitor's on-screen display (OSD) preferences to be propagated for synchronization.

In accordance with at least one embodiment, a display can switch its multiplexer from its USB-C1 (daisy chain UFP) port to its USB-C2 (PC UFP) port to autonomously initiate usurpation of the role of the primary node in the ring network of displays. The multiplexer's selection of the USB-C2 (PC UFP) port instead of the USB-C1 (daisy chain UFP) port breaks the differential signal line, Hot-plug Detect and Auxiliary Channel connection between that display and the preceding display (except for the CC, the continuity of which, as noted above, may be maintained regardless of the state of the multiplexer).

In accordance with at least one embodiment, a loopback connection is established from a last node to a first node of a series of sequentially connected displays to form a ring display network, where the first node and last node can be dynamically configured. This allows the possibility of a host computer (PC) connected to any display within the ring display network to be selected as the active source and to be able to project content to all other display screens, as well as being able to detect all the devices (e.g., displays, host computers, and USB devices connected to the displays) in the ring display network.

In accordance with at least one embodiment, a method includes, in a first display connected according to a ring network topology, sending, at a downstream-facing port (DFP) of the first display, a message downstream via the plurality of displays. The method further includes checking for receipt of the message via a first upstream-facing port (UFP) of the first display. The method further includes, upon receipt of the message via the first UFP of the first display, configuring a multiplexer to switch from selection of the first UFP of the first display to selection of a second UFP of the first display. In accordance with at least one embodiment, the sending, at the DFP of the first display, the message downstream via the plurality of displays is performed in response a host computer being connected to the second UFP of the first display.

In accordance with at least one embodiment, the first display is configured to maintain continuity of a configuration channel (CC) of the ring network topology regardless of selection of the second UFP of the first display by the multiplexer. In accordance with at least one embodiment, the first UFP, the second UFP, and the DFP of the first display are Universal Serial Bus Type C (USB-C) ports. In accordance with at least one embodiment, the first UFP, the second UFP, and the DFP of the first display are Display Port (DP) ports. In accordance with at least one embodiment, the method further includes, in a second display, receiving the message sent downstream by the first display, wherein a second display multiplexer of the second display is configured to maintain selection of a second display first UFP of the second display, wherein the second display is configured to relay via a second display DFP of the second display the message sent by the first display and received by the second display. In accordance with at least one embodiment, the sending, at the downstream-facing port (DFP) of the first display, the message downstream via the displays, the checking for the receipt of the message via the first upstream-facing port (UFP) of the first display, and the configuring the multiplexer are controlled by a scaler of the first display.

In accordance with at least one embodiment, an information handling system (IHS) comprises a plurality of displays, each of said plurality of displays comprising a first upstream-facing port (UFP), a second UFP, a downstream-facing port (DFP), and a multiplexer for selecting among the first UFP and the second UFP, wherein the DFP of each display of the plurality of displays is connected to the first UFP of its respective succeeding display so as to form a ring network topology of the plurality of displays, wherein a host computer is connected to the second UFP of a first display of the plurality of displays, the multiplexer of the first display configured to select the second UFP. In accordance with at least one embodiment, the first display is configured, prior to the multiplexer of the first display selecting the second UFP, to send a message downstream via the DFP of the first display, wherein the first display is configured to receive the message via the first UFP of the first display, and wherein the multiplexer of the first display is configured to select the second UFP after receipt of the message via the first UFP of the first display.

In accordance with at least one embodiment, a second display of the plurality of displays is configured to receive the message sent by the first display via the first UFP of the second display, wherein the multiplexer of the second display of the plurality of displays is configured to maintain selection of the first UFP of the second display, and the second display of the plurality of displays is configured to relay via the DFP of the second display the message sent by the first display and received by the second display. In accordance with at least one embodiment, the first display is configured to send the message downstream, to receive the message via the first UFP, and to select the second UFP after receipt of the message in response to the host computer being connected to the second UFP of a first display. In accordance with at least one embodiment, the plurality of displays are configured to maintain continuity of a configuration channel (CC) of the ring network topology regardless of selection of the second UFP of the first display by the multiplexer of the first display. In accordance with at least one embodiment, the first upstream-facing port (UFP), the second UFP, and the downstream-facing port (DFP) of each of the plurality of displays are Universal Serial Bus Type C (USB-C) ports. In accordance with at least one embodiment, the first upstream-facing port (UFP), the second UFP, and the downstream-facing port (DFP) of each of the plurality of displays are Display Port (DP) ports.

In accordance with at least one embodiment, a method comprises, in a first display among a plurality of displays connected sequentially according to a ring network topology, sending, at a unidirectionally constrained downstream-facing port (DFP) of the first display, a message downstream via the plurality of displays. The method further comprises checking for receipt of the message via a first unidirectionally constrained upstream-facing port (UFP) of the first display. The method further comprises, upon receipt of the message via the first unidirectionally constrained UFP of the first display, configuring a multiplexer to switch from selection of the first unidirectionally constrained UFP of the first display to selection of a second unidirectionally constrained UFP of the first display. In accordance with at least one embodiment, the sending, at the unidirectionally constrained DFP of the first display, the message downstream via the plurality of displays is performed in response a host computer being connected to the second unidirectionally constrained UFP of the first display.

In accordance with at least one embodiment, the first display is configured to maintain continuity of a configuration channel (CC) of the ring network topology regardless of selection of the second unidirectionally constrained UFP of the first display by the multiplexer. In accordance with at least one embodiment, the first unidirectionally constrained UFP, the second unidirectionally constrained UFP, and the unidirectionally constrained DFP of the first display are Universal Serial Bus Type C (USB-C) ports. In accordance with at least one embodiment, the first unidirectionally constrained UFP, the second unidirectionally constrained UFP, and the unidirectionally constrained DFP of the first display are Display Port (DP) ports. In accordance with at least one embodiment, the method further comprises, in a second display of the plurality of displays, receiving the message sent downstream by the first display, wherein a second display multiplexer of the second display is configured to maintain selection of a second display first unidirectionally constrained UFP of the second display, wherein the second display is configured to relay via a second display unidirectionally constrained DFP of the second display the message sent by the first display and received by the second display.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. Information handling systems can also include one or more buses operable to transmit information between the various hardware components.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
in a first display among a plurality of displays connected according to a ring network topology, sending, at a downstream-facing port (DFP) of the first display, a message downstream via the displays, wherein the message includes a unique random number;
checking for receipt of the message via a first upstream-facing port (UFP) of the first display; and
upon receipt of the message via the first UFP of the first display, configuring a multiplexer to switch from selection of the first UFP of the first display to selection of a second UFP of the first display, wherein the first display is configured to maintain continuity of a configuration channel (CC) of the ring network topology regardless of selection of the second UFP of the first display by the multiplexer.

2. The method of claim 1, wherein the sending, at the DFP of the first display, the message downstream via the plurality of displays is performed in response a host computer being connected to the second UFP of the first display.

3. The method of claim 1, wherein the first UFP, the second UFP, and the DFP of the first display are Universal Serial Bus Type C (USB-C) ports.

4. The method of claim 1, wherein the first UFP, the second UFP, and the DFP of the first display are Display Port (DP) ports.

5. The method of claim 1, further comprising:
in a second display of the plurality of displays, receiving the message sent downstream by the first display, wherein a second display multiplexer of the second display is configured to maintain selection of a second display first UFP of the second display, wherein the second display is configured to relay via a second display DFP of the second display the message sent by the first display and received by the second display.

6. The method of claim 1, wherein the sending, at the downstream-facing port (DFP) of the first display, the message downstream via the plurality of displays, the checking for the receipt of the message via the first upstream-facing port (UFP) of the first display, and the configuring the multiplexer are controlled by a scaler of the first display.

7. An information handling system (IHS) comprising:
a plurality of displays, each of the displays including a first upstream-facing port (UFP), a second UFP, a downstream-facing port (DFP), and a multiplexer for selecting among the first UFP and the second UFP, wherein the DFP of each display is connected to the first UFP of its respective succeeding display so as to form a ring network topology of the displays, wherein a host computer is connected to the second UFP of a first display of the displays, the multiplexer of the first display configured to select the second UFP;
wherein the first display is configured, prior to the multiplexer of the first display selecting the second UFP, to send a message downstream via the DFP of the first display, wherein the message includes a unique random number, wherein the first display is configured to receive the message via the first UFP of the first display, and wherein the multiplexer of the first display is configured to select the second UFP after receipt of the message via the first UFP of the first display, wherein the plurality of displays are configured to maintain continuity of a configuration channel (CC) of the ring network topology regardless of selection of the second UFP of the first display by the multiplexer of the first display.

8. The IHS of claim 7, wherein a second display of the plurality of displays is configured to receive the message sent by the first display via the first UFP of the second display, wherein the multiplexer of the second display of the plurality of displays is configured to maintain selection of the first UFP of the second display, and the second display of the plurality of displays is configured to relay via the DFP of the second display the message sent by the first display and received by the second display.

9. The IHS of claim 7, wherein the first display is configured to send the message downstream, to receive the message via the first UFP, and to select the second UFP after receipt of the message in response to the host computer being connected to the second UFP of a first display.

10. The IHS of claim 7, wherein the first upstream-facing port (UFP), the second UFP, and the downstream-facing port (DFP) of each of the plurality of displays are Universal Serial Bus Type C (USB-C) ports.

11. The IHS of claim 7, wherein the first upstream-facing port (UFP), the second UFP, and the downstream-facing port (DFP) of each of the plurality of displays are Display Port (DP) ports.

12. A method comprising:
in a first display among a plurality of displays connected sequentially according to a ring network topology, sending, at a unidirectionally constrained downstream-facing port (DFP) of the first display, a message downstream via the displays, wherein the message includes a unique random number;
checking for receipt of the message via a first unidirectionally constrained upstream-facing port (UFP) of the first display; and
upon receipt of the message via the first unidirectionally constrained UFP of the first display, configuring a multiplexer to switch from selection of the first unidirectionally constrained UFP of the first display to selection of a second unidirectionally constrained UFP of the first display, wherein the first display is configured to maintain continuity of a configuration channel (CC) of the ring network topology regardless of selection of the second unidirectionally constrained UFP of the first display by the multiplexer.

13. The method of claim 12, wherein the sending, at the unidirectionally constrained DFP of the first display, the message downstream via the plurality of displays is performed in response a host computer being connected to the second unidirectionally constrained UFP of the first display.

14. The method of claim 12, wherein the first unidirectionally constrained UFP, the second unidirectionally constrained UFP, and the unidirectionally constrained DFP of the first display are Universal Serial Bus Type C (USB-C) ports.

15. The method of claim 12, wherein the first unidirectionally constrained UFP, the second unidirectionally constrained UFP, and the unidirectionally constrained DFP of the first display are Display Port (DP) ports.

16. The method of claim 12, further comprising:
in a second display of the plurality of displays, receiving the message sent downstream by the first display, wherein a second display multiplexer of the second display is configured to maintain selection of a second display first unidirectionally constrained UFP of the second display, wherein the second display is configured to relay via a second display unidirectionally constrained DFP of the second display the message sent by the first display and received by the second display.

* * * * *